UNITED STATES PATENT OFFICE.

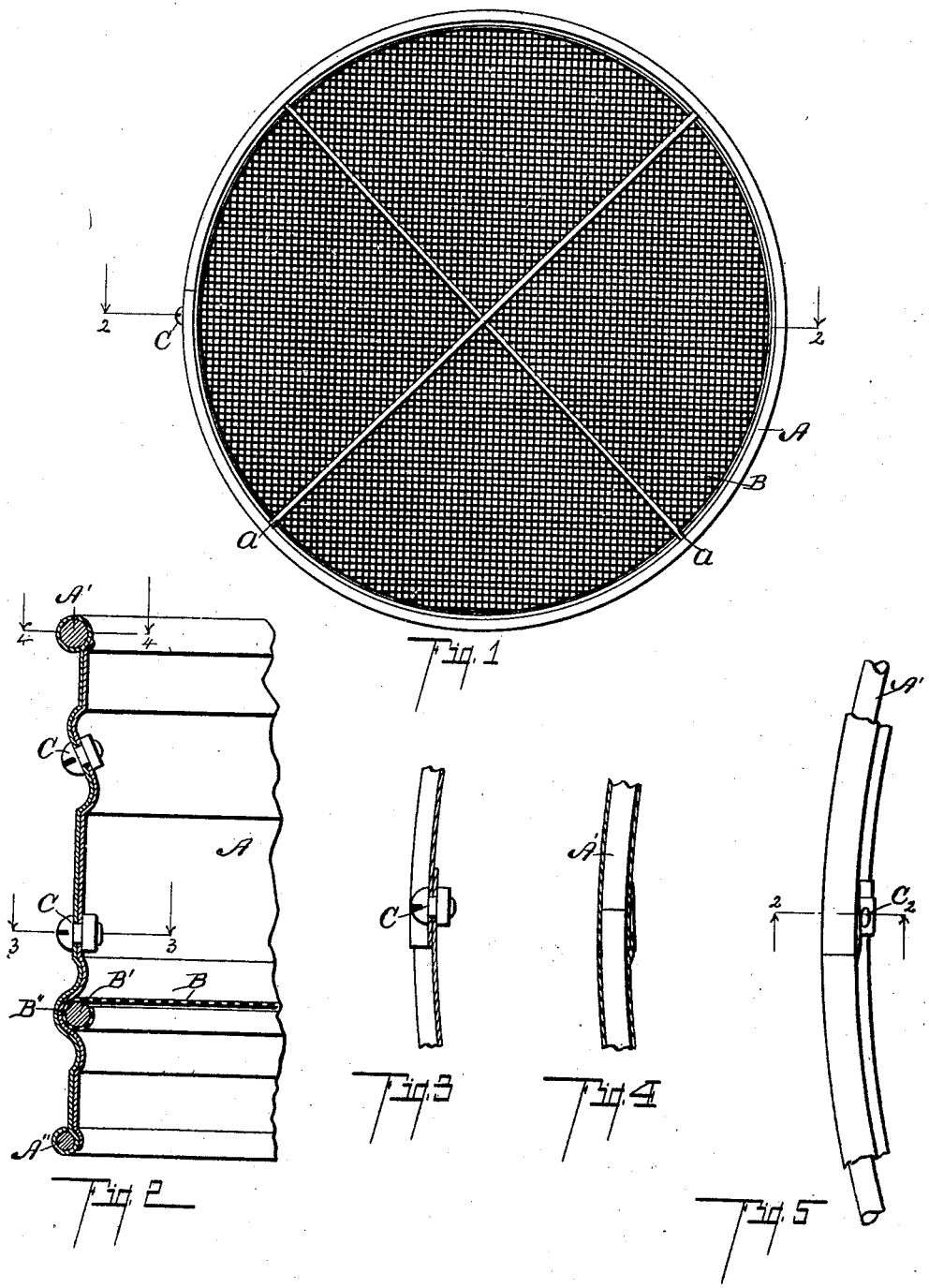

THOMAS LOURIM, OF BATTLE CREEK, MICHIGAN.

SIEVE.

No. 832,685.     Specification of Letters Patent.     Patented Oct. 9, 1906.

Application filed August 16, 1905. Serial No. 274,502.

*To all whom it may concern:*

Be it known that I, THOMAS LOURIM, a citizen of the United States, residing at the city of Battle Creek, county of Calhoun, State of Michigan, have invented certain new and useful Improvements in Sieves, of which the following is a specification.

This invention relates to improvements in sieves.

My improved sieve is particularly designed by me as a riddle for molders' use, although it possesses features which render it valuable for use in other relations.

The main object of this invention is to provide an improved sieve which is very simple and economical in structure and at the same time very strong and durable and one from which the screen may be readily removed or inserted therein.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is an inverted plan view of my improved sieve. Fig. 2 is an enlarged detail vertical sectional view taken on a line corresponding to line 2 2 of Figs. 1 and 5. Fig. 3 is an enlarged detail sectional view taken on a line corresponding to line 3 3 of Fig. 2, showing structural details. Fig. 4 is a detail sectional view taken on a line corresponding to line 4 4 of Fig. 2, showing structural details. Fig. 5 is a detail plan view showing the joints in the rim.

Referring to the drawings, the sieve frame or rim A is formed of a strip of sheet metal and is preferably rim or band like in form. The ends of the strip are overlapped and detachably secured together by bolts C, which are arranged through the overlapping portions thereof. The edges of the rim are rolled outwardly to form beads which embrace the rods A' A''. The ends of the rods A' A'' project at one end of the rim and form dowels. These rods do not extend quite to the opposite end of the beads, the beads forming sockets to receive the projecting ends of the rods or dowels. By this arrangement the ends of the rim are connected together, and when the bolts C are in place a very secure and rigid joint is obtained. It is evident that the parts can be assembled very quickly and easily.

The rim A is preferably provided with suitable annular corrugations to strengthen the same, as is illustrated in the drawings. Toward the bottom of the rim is an annular groove-like seat B'' for the screen. The edges of the screen B are rolled over and secured to the ring B', the diameter of which is such as to allow it to rest in the seat B'' when the ends of the rim are secured together. Below the screen-seat is a pair of radially-arranged brace-rods a.

In inserting the screen it is only necessary to free the ends of the rim and drop the screen into its seat and again secure the ends of the rim together. It is evident that this can be done quickly and easily. This structure is of very great advantage, as for molders' use the screens are likely to become gummed up or clogged, and it is often necessary to use several screens of different mesh. If desired, one rim or frame can be made to answer for several screens. The screen is so supported by the ring B' that, if desired, the same can be placed in the fire a short time for the purpose of cleaning. This will be found to be a very great advantage as a time-saver. Also the structure is very economical on account of its structural simplicity and durability and the convenience with which it may be manipulated.

Having thus described my invention, what I claim as new, and desire to secure by Letters Patent, is—

1. In a sieve, the combination of a frame or a rim formed of a strip of sheet metal, having its ends overlapped and its edges formed into beads; rods arranged in said beads and projecting therefrom at one end to form dowels, and the other end of said beads forming sockets to receive the same; a screen-seat in said rim; a screen; a wire ring to which the edges of said screen are secured; and bolts arranged through the overlapped ends of said rim whereby the same are detachably secured together, for the purpose specified.

2. In a sieve, the combination of a frame or a rim formed of a strip of sheet metal, having its ends overlapped, one end of said rim having dowel-pins thereon and the other, sockets to receive said dowel-pins; an annular groove-like screen-seat formed in said rim; a screen; a wire ring to which the edges of said screen are secured; and bolts arranged through the overlapped ends of said rim whereby the same are detachably secured together, for the purpose specified.

3. In a sieve, the combination of a frame or a rim formed of a strip of sheet metal, having its ends overlapped, one end of said rim having dowel-pins thereon, and the other, sockets to receive said dowel-pins; a screen-seat in said rim; a screen; a wire ring to which the edges of said screen are secured; and bolts arranged through the overlapped ends of said rim whereby the same are detachably secured together, for the purpose specified.

In witness whereof I have hereunto set my hand and seal in the presence of two witnesses.

THOMAS LOURIM. [L. S.]

Witnesses:
ETHEL A. TELLER BRADFORD,
OTIS A. EARL.